(12) United States Patent  (10) Patent No.:     US 6,323,491 B1
Forsyth  (45) Date of Patent:     Nov. 27, 2001

(54) CORONA DISCHARGE IMAGING SYSTEM FOR OUTDOOR DAYLIGHT USE

(75) Inventor: Keith W. Forsyth, Philadelphia, PA (US)

(73) Assignee: Forsyth Electro-Optics, Philadelphia, PA (US)

( * ) Notice: Subject to any disclaimer, the term of this patent is extended or adjusted under 35 U.S.C. 154(b) by 0 days.

(21) Appl. No.: 09/442,378

(22) Filed: Nov. 17, 1999

Related U.S. Application Data

(60) Provisional application No. 60/108,840, filed on Nov. 18, 1998.

(51) Int. Cl.$^7$ ................. G01J 1/42; G01J 3/00; H01J 40/14
(52) U.S. Cl. ................. 250/372; 250/214 VT; 250/226; 356/300
(58) Field of Search ................. 250/214, 226, 250/372; 356/300; 385/16, 19

(56) References Cited

U.S. PATENT DOCUMENTS

| | | | |
|---|---|---|---|
| 5,021,668 | 6/1991 | Talmore et al. | 250/372 |
| 5,574,286 | 11/1996 | Huston et al. | 250/372 |
| 5,886,344 | * 3/1999 | Forsyth | 250/214 VT |

OTHER PUBLICATIONS

Malka Lindner, et al., Solar Blind Bandpass Filters for UV Imaging Devices, Proceedings of the SPIE, Jan. 1998, pp. 176–183, vol. 3302, Israel.

Malka Lindner, et al., Solar Blind and Bispectral Imaging with ICCD, BCCD, and EBCCD, Proceedings of the SPIE, Jul. 1998, pp. 22–31, vol. 3434, Israel.

Malka Lindner, et al., UV Devices for Solar Blind & Background Limited Detection, Optical Engineering in Israel Proceedings of the SPIE, Mar. 1997, pp. 1–8, vol. 3110, Israel.

About OFIL and Datcor Camera (Visible—UV Solar Blind Bispectral Camera), Oct. 15, 1999, internet website.

W.L. Vosloo, Daylight Corona Discharge Observation and Recording System, Technology Research and Investigations, Oct. 15, 1999, internet website.

Corocam IV, The Daylight Corona–Detection Camera, Oct. 15, 199, internet website.

* cited by examiner

*Primary Examiner*—Georgia Epps
*Assistant Examiner*—Mohammed Hasan
(74) *Attorney, Agent, or Firm*—Duane, Morris & Heckscher LLP

(57) ABSTRACT

A corona detector for detecting a corona associated with a remote object under outdoor daylight conditions. A selective optical filter filters light from the remote object, wherein the optical filter passes one or more of the corona emission bands centered at wavelengths below approximately 290 nanometers (nm) and rejects radiation at wavelengths above approximately 290 nm. A operatively coupled to the optical filter forms an image of the remote object, the lens having high transmissivity in the ultraviolet spectrum.

18 Claims, 1 Drawing Sheet

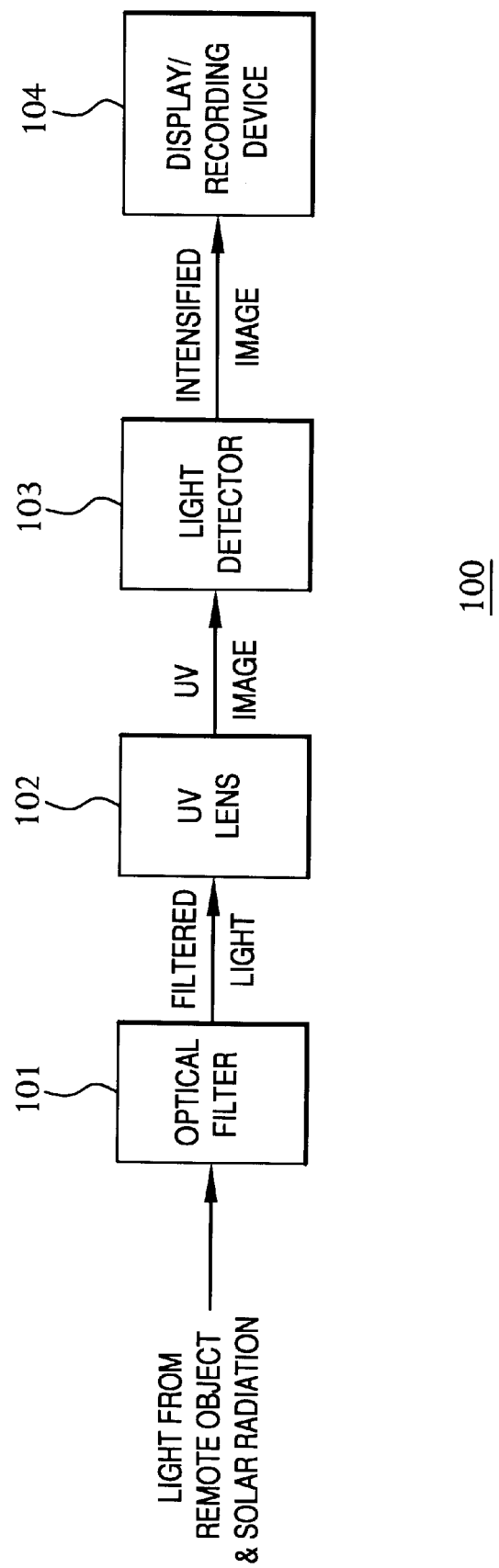

CORONA DISCHARGE IMAGING SYSTEM FOR OUTDOOR DAYLIGHT USE

CROSS-REFERENCES TO RELATED APPLICATIONS

This nonprovisional U.S. national application, filed under 35 U.S.C. § 111(a), claims, under 37 C.F.R. § 1.78(a)(3), the benefit of the filing date of provisional U.S. national application no. 60/108,840, entitled "Daylight Corona Discharge Imaging System Employing Selective Filter Having Transmission in Certain Wavelength Bands," filed on Nov. 18, 1998 under 35 U.S.C. § 111(b), the entirety of which is incorporated herein by reference.

This application is related to co-owned U.S. Pat. No. 5,886,344, for "Corona Detector with Narrow-Band Optical Filter," inventor Keith W. Forsyth, issued Mar. 23, 1999, the entirety of which is incorporated herein by reference; and to U.S. patent application Ser. No. 09/261,532, U.S. Pat. No. 6,150,652 inventor Keith W. Forsyth, under docket no. D3530-00002, filed Mar. 3, 1999, the entirety of which is incorporated herein by reference.

BACKGROUND OF THE INVENTION

1. Field of the Invention

The present invention relates to apparatuses and methods for the detection of electrical corona discharge and, in particular, to detection of corona discharge under outdoor daylight conditions.

2. Description of the Related Art

High-voltage electrical apparatus often are surrounded by a corona discharge which occurs when the electric field in the surrounding air exceeds the threshold for dielectric breakdown of air. When this occurs, the air surrounding the high-voltage apparatus ceases to be an insulator and becomes partially conducting. For example, apparatus such as electrical power transmission lines, transformer and substation insulators and bushings, high-voltage power supplies, and the like often have coronas associated therewith. It is desirable to detect the position and extent of such coronas in order to detect and address potential equipment failure. These coronas, which are also sometimes referred to as corona discharges, will be referred to herein simply as coronas.

Coronas are typically most easily visible or detectable by various techniques in dim light or darkness. However, there is a need to be able to detect coronas under conditions of outdoor daylight (sunlight).

One technique used to detect and identify the general position of coronas involves the use of ultrasonic microphones. However, ultrasonic microphones do not provide an image and thus cannot precisely locate the source of most corona discharges.

Conventional night-vision equipment which incorporates image intensifier tubes is also sometimes used to locate corona discharges, and can be used to provide an image of a corona, in addition to detecting the corona, unlike ultrasonic techniques. Unfortunately, conventional night-vision equipment has relatively poor sensitivity to the optical energy emitted by a corona discharge, and much better sensitivity to both sunlight and artificial lighting, requiring the equipment to be operated in virtually complete darkness and giving poor sensitivity to corona. This is inconvenient and expensive.

The primary obstacle to practical corona discharge imaging under outdoor daylight conditions is the intense background light from the sun, which is far more intense than the light emitted by corona discharge. Radiation emitted by the sun exhibits a substantially continuous spectrum extending from the far ultraviolet (UV) to the far infrared; this spectrum is roughly equivalent to a "black body radiator" at a temperature of 6,000 degrees Kelvin.

Corona discharges in air associated with high-voltage electrical apparatus emit optical radiation of a mainly non-continuous spectrum; this radiation is concentrated in a large number of narrow spectral bands or "lines" that occur at wavelengths ranging from the far UV to the infrared (the UV spectrum ranges in wavelength from about 200 to 400 nanometers (nm)). The most intense of these lines fall within the UV spectrum at a wavelength range of approximately 295 to 400 nm, a portion of the optical spectrum where solar background radiation is sufficiently intense to interfere with corona discharge imaging under outdoor daylight conditions. These emission lines are primarily a subset of the molecular nitrogen emission spectrum second positive emission lines.

Co-owned U.S. Pat. No. 5,886,344 (the '344 patent) teaches a corona detector which uses narrow-band optical filtering centered at one or more of these narrow emission lines, combined with a suitable UV-sensitive detector, to enable images of corona discharge to be obtained even in the presence of moderate background light. However, in order to obtain corona images outdoors during daylight hours, the corona detector of the '344 patent would require the use of optical filters having an extremely narrow bandwidth (i.e., less than 0.1 nm) in order to provide sufficient attenuation of solar background radiation. Fabrication of optical filters with such an extremely narrow bandwidth in the UV portion of optical the spectrum is impractical using currently-available optical technology, and is likely to remain so in the near future.

There is, therefore, a need for improved outdoor daylight corona detection techniques.

SUMMARY

A corona detector for detecting a corona associated with a remote object under outdoor daylight conditions. A selective optical filter filters light from the remote object, wherein the optical filter passes one or more of the corona emission bands centered at wavelengths shorter than approximately 290 nanometers (nm) and rejects radiation at wavelengths longer than approximately 290 nm. A lens operatively coupled to the optical filter forms an image of the remote object, the lens having high transmissivity in the ultraviolet spectrum.

BRIEF DESCRIPTION OF THE DRAWINGS

These and other features, aspects, and advantages of the present invention will become more fully apparent from the following description, appended claims, and accompanying drawings in which:

The FIGURE is a block diagram of an outdoor daylight corona discharge imaging system, in accordance with an embodiment of the present invention.

DESCRIPTION OF THE PREFERRED EMBODIMENT

The light emitted by corona discharges in air is heavily concentrated in a relatively small number of very narrow bandwidths, typically a few nanometers or less. The corona emission wavelengths are primarily in the ultraviolet (UV)

spectrum, with very weak emission intensity between the peaks of these bands. The corona emission wavelengths at which corona discharge is concentrated or peaks in emission lines, i.e. wavelengths at which discharges have a relatively strong emission intensity, may be said to be wavelengths which are characteristic of corona discharge in air. These wavelength bands at which corona discharges have a peak or relatively strong emission intensity, centered on corona emission lines, may be referred to herein as corona emission bands. A corona emission band is thus a band of wavelength centered at a corona emission line, at which there is a peak or relative concentration of corona emission intensity. The wavelengths at which these intensity peaks occur are characteristic of electronic transitions of the constituents of air, notably the electronic transitions of neutral molecular nitrogen ($N_2$) and of nitrogen monoxide (NO).

The emission spectrum of a corona in ordinary air extends in wavelength from at least 200 nm to approximately 440 nm, and is dominated by the series of strong emission lines or bands of neutral molecular nitrogen designated by spectroscopists as the second positive system or series, which falls predominantly between 295 and 440 nm. Most of the optical energy emitted by a corona is in the form of UV light, and the corona emission spectrum is thus discontinuous and UV-rich. The emission lines that occur between 200 and 290 nanometers are described in further detail below.

In contrast with the discontinuous and UV-rich nature of the corona emission spectrum, most sources of ambient light, including artificial lighting from lamps and sunlight, emit more or less continuous spectra that cover hundreds of nanometers of bandwidth, and are more intense in the visible and/or near-infrared portions of the spectrum than in the UV spectrum. As noted above, the corona detector of the '344 patent uses narrow-band optical filtering centered at the molecular nitrogen emission spectrum second positive emission lines, combined with a suitable UV-sensitive detector, to enable images of corona discharge to be obtained. However, because of the intense solar radiation intensity present at these wavelengths, the corona detector of the '344 patent, if used in bright daylight (as opposed to inside under artificial light, or outside at night), would require optical filters having an extremely narrow bandwidth in order to provide sufficient attenuation of the solar background radiation.

As noted previously, radiation emitted by the sun exhibits a substantially continuous spectrum extending from the far UV to the far infrared. However, essentially all radiation emitted by the sun at UV wavelengths shorter than 290–295 nm is absorbed by atmospheric ozone before it reaches the earth's surface, and therefore the terrestrial solar radiation from sunlight, at the earth's surface, is effectively zero at wavelengths shorter than 290 nm.

In the present invention, optical filtering is used to detect corona discharge at characteristic corona UV wavelengths which are shorter than 290 nm. Because there is virtually no solar background radiation present below 290 nm, even in bright daylight, the selective optical filter of the present invention need not have a narrow bandwidth bandpass optical filter as would be required at higher wavelengths where there is a large amount of solar radiation. Since there is no solar background radiation present in the UV spectrum below 290 nm, it is not necessary that the optical filter employ narrow passbands, or even employ passbands at all. Instead, the optical filter need only substantially block all radiation at wavelengths higher than 290 nm, and pass UV wavelengths below 290 nm which contain one or more UV corona emission lines. Such selective optical filters may be more practically manufactured, manufactured at lower cost, and/or be more widely available, than those with narrow or extremely narrow passbands.

Referring now to the FIGURE, there is shown a block diagram of an outdoor daylight corona discharge imaging system (i.e., corona detector) 100, in accordance with an embodiment of the present invention. Corona detector 100 of the present invention, in one embodiment, comprises four basic elements: selective optical filtering system (selective optical filter) 101, image-forming lens 102, light image detecting device (light detector) 103, and display/recording device 104. The component parts of corona detector 100 are preferably assembled into a external housing (not shown) to form a single corona detector unit, and such that the correct mechanical spacings are maintained. This unit may be held in the hands, or mounted on a tripod or other rigid support, and pointed toward the area of the apparatus to be inspected. Typically, this area will be located 3 to 50 meters away from the corona detector unit 100 and its user.

Optical filter 101 receives light from the remote object (i.e., the corona discharge-caused light) as well as ambient radiation such as solar radiation. Filter 101 selectively passes certain wavelengths shorter than 290 nm that are characteristic of corona discharge in air, and rejects all wavelengths longer than 290 nm, i.e. it rejects all terrestrial solar radiation. Optical filter 101 may be physically located anywhere in front of the light-sensitive input surface of light image detecting device 103, including before, inside, or after image-forming lens 102. In an embodiment, as illustrated in FIG. 1, optical filter 101 is placed before the lens. In an embodiment, optical filter 101 is a shortpass filter that passes light at wavelengths shorter than 290 nm, down to at least 200 nm. In an embodiment, it is not necessary to pass light below 200 nm because any UV light below 185–200 nm is quickly absorbed by air and thus cannot be detected more than a few feet away from the object generating the corona.

Image-forming lens 102 has efficient transmission in the UV portion of the spectrum, and specifically between approximately 200 nm and 290 nm, in an embodiment. Lens 102 thus receives the filtered light from optical filter 101 (i.e., the light having solar radiation removed) and thus provides a UV image of the corona to light image detecting device 103. Detector 103 is thus sensitive to UV and amplifies the UV image.

The UV image provided by optical filter 101 and lens 102 is invisible to the human eye. Light image detecting device 103 is therefore used to detect the UV image. Light image detecting device 103 has a useful degree of UV sensitivity covering the range of corona emissions passed by optical filter 101, and preferably between approximately 200 and approximately 280 nm. The sensitivity of device 103 need not extend beyond 280–290 nm, because optical filter 103 rejects all radiation beyond this range anyway; and it need not extend below 200 nm, because any UV light below 185–200 nm is absorbed by air in a short distance and generally does not reach optical filter 101 in the first place. Indeed, as noted below, in an embodiment, it is preferred that light detector 103 be of the "solar blind" type, in which the sensitivity of light detector 103 beyond 290 nm is reduced or minimized with respect to the sensitivity in the sub-290 nm range.

Light image detecting device 103 is used, in an embodiment, to intensify or amplify, or otherwise detect, the UV image of the corona present in the focused, filtered light received from lens 102. The intensified or detected image is then provided to display/recording device 104, which displays and/or records the output image produced by the light detector, so that a human user viewing the image, or other device for analyzing such images, can analyze the image to determine the presence of a corona. In an embodiment, light image detecting device 103 and display device 104 may be part of the same integrated component. For example, an image intensifier may be used to both detect light and display the captured image on a screen.

Thus, the present invention uses an optical filter to select one or more optical wavelengths between 200 and 290 nm, which wavelengths are UV corona emission lines characteristic of corona discharge in air, while rejecting all wavelengths longer than 290 nm. The present invention therefore allows coronas to be imaged, and thus detected, even in bright outdoor daylight and without requiring impractical or expensive extremely narrow bandwidth optical filters.

The four primary elements 101–104 are described in further detail as follows.

Image-forming Lens

The term "lens" refers to any image-forming device employing one or more lens and/or mirror elements, and includes but is not limited to mirror and catadioptric systems. Lens 102 is, in an embodiment, of any type of lens which passes the wavelengths selected by filter 101 with relatively high sensitivity, and which possesses sufficient spatial resolution to provide adequate image sharpness. In one embodiment, UV lens 102 is composed of multiple lens elements, fabricated from materials with low attenuation in the 200–280 nm region, such as silica (quartz), calcium fluoride, magnesium fluoride, sapphire, and/or UV-transmitting optical glasses.

In an embodiment, the relatively high sensitivity required to pass the wavelengths selected by filter 101 means that lens 101 has an absolute transmission greater than approximately 50%. In general, a lens having a small f-number (e.g., approximately f/2 or smaller) is preferred, in order to collect the maximum amount of corona emission light, although f-numbers greater than 2 may also produce useful results. In an embodiment, the spatial resolution of lens 102 should be equal to or slightly greater than that of the light image detecting device 103. The angular field of the lens may be selected at will, although fields of one to ten degrees (full field) are preferred. In various embodiments, lens 102 comprises reflective lens systems of Cassegrain form; refractive lens systems of double-Gauss form utilizing fused silica and calcium fluoride elements; or various catadioptric lens systems employing a combination of reflective and refractive elements.

As will be appreciated, other focal lengths, relative apertures, and other lens specifications may be utilized in alternative embodiments, depending upon the specific application. However, when varying these specifications, UV lens 102 preferably has low attenuation between 200 and 280 nm and a modulation transfer function (MTF) approximately matching that of light image detector 103.

Optical Filter

Optical filter 101 preferably passes as much as possible of the sub-290 nm optical signal characteristically emitted by corona discharge. In particular, in an embodiment, optical filter 101 of corona detector 100 passes light emission from corona discharge occurring in one or more of a series of nine primary emission bands falling between approximately 205 nm and approximately 285 nm and spaced approximately 10 nm apart, on average. The corona light emission in these specific lines or bands may be tentatively identified as belonging primarily to the so-called "fourth positive" series of emission lines of neutral molecular nitrogen ($N_2$), and to the "gamma" bands of nitrogen monoxide (NO), as is understood by those skilled in the art of optical spectroscopy. Some of the molecular nitrogen emission spectrum second positive emission lines also occur near the far end of the sub-solar range, e.g. bands centered at emission lines at 268.7 nm, 281.0 nm, and 282.0 nm. Spectral lines belonging to the "Gaydon-Herman" singlet system of neutral molecular nitrogen ($N_2$) also occur at wavelengths shorter than 290 nanometers. A weaker, continuous emission arising from the corona plasma also occurs in the same wavelength range.

Of these sub-290 run emission bands, the strongest corona emission generally occurs in the nine bands centered at emission lines of approximately 204.5, 215.0, 226.0, 235.0, 236.0, 244.5, 246.5, 254.5 and 258.5 nm. Accordingly, in an embodiment, the optical filter preferably passes at least one, and preferably all nine, of these wavelength bands for the best performance in daylight.

As described above, in addition to passing one or more of the spectral bands designated above, optical filter 101 must also reject a large fraction of the solar background radiation present in the scene being imaged. As noted before, this interfering solar background radiation is confined to wavelengths of approximately 290 nm and longer. If optical filter 101 rejects too little of this solar radiation, then the corona images will be undetectable against the bright solar background. However, it is impossible under current technology to construct a filter which rejects or blocks 100% of optical energy at wavelengths longer than 290 nm. Therefore, optical filter 101 preferably rejects at least a minimum amount of electromagnetic radiation above 290 nm in wavelength, sufficient to permit daylight imaging of coronas from the UV corona emissions below 290 nm. In the present application, to say that optical filter 101 rejects radiation above 290 nm means that optical filter 101 rejects this radiation in comparison to the light in the passband (205–285 nm), and that the filter 101 rejects enough of this above-290 nm radiation sufficient to permit daylight imaging of coronas from the UV corona emissions below 290 nm.

The degree of light rejection required of optical filter 101 is not the same for all wavelengths. Since the sensitivity of the light image detecting device 103 varies with wavelength, the rejection required of optical filter 101 will depend upon the specific properties of the light image detecting device 103. As described below, a light imaging device employing a photocathode material having a relatively large sensitivity at wavelengths between approximately 200 and 285 nm and minimum possible sensitivity at wavelengths longer than 290 nm is preferred.

Once a photocathode material for use in light image detecting device 103 has been selected, the allowable fraction of the radiation passed by optical filter 101 may in general be approximated by means of the design relationship or inequality (1) shown below, which is applicable to wavelengths equal to or greater than 290 nm:

$$2 \cdot 10^{-13} \leq T(\lambda)Q(\lambda) \leq 2 \cdot 10^{-9} \qquad (1)$$

where $T(\lambda)$ is the fraction of incoming radiation passed by optical filter 101 as a function of wavelength, and $Q(\lambda)$ is the fractional quantum efficiency of the light image detecting device photocathode as a function of wavelength. (A fractional value of 1 is equivalent to 100%, and a fractional value of 0.1 is equivalent to 10%.)

Where light image detecting device 103 utilizes a photocathode of the solar blind type, including CsTe, RbTe, and CsRbTe, the above equation may be used for all wavelengths equal to or greater than 350 nm; for wavelengths between 290 and 350 nm, the fraction of incoming radiation passed by optical filter 101 (i.e., $T(\lambda)$) may be set approximately equal to the value obtained from inequality (1) at a wavelength of 350 nm. This places is a less stringent requirement on optical filter 101. The boundaries given above for the value of $T(\lambda)Q(\lambda)$ are general and approximate; a value of $T(\lambda)Q(\lambda)$ less than $2 \cdot 10^{-13}$ or greater than $2 \cdot 10^{-9}$ is, in one embodiment, preferred in some cases.

With regard to the bandwidth of optical filter 101, there is no specific minimum or maximum bandwidth requirement, as long as the filter passes one or more of the specified corona emission lines and simultaneously provides for a sufficient degree of rejection beyond 290 nm.

In one embodiment, optical filter 101 is of the thin-film interference type, of a transmissive design and fabricated on a single substrate. Such a transmissive design interference-type optical filter transmits the radiation to be passed (wavelengths less than 290 nm) and reflects the radiation to be rejected (wavelengths greater than 290 nm). Selectively-absorbing layers and/or substrates (for "blocking") may also be used in combination with the interference layers to produce the desired result.

In an alternative embodiment, optical filter 101 is of the absorption type, such that the radiation to be passed (wavelengths less than 290 nm) is transmitted by the filter material and the radiation to be rejected (wavelengths greater than 290 nm) is absorbed by the filter material. Such filters may be composed of combinations of transition-metal or lanthanide salts, absorbing glasses, or organic dyes.

In an alternative embodiment, optical filter 101 is of the thin-film interference type but is of a reflective design rather than a single-substrate transmissive design. In such a reflective design interference-type optical filter, the radiation to be passed (wavelengths shorter than 290 nm) is sequentially reflected from each of the one or more substrates, and the radiation to be rejected (wavelengths longer than 290 nm) is transmitted through one or more of the substrates and then absorbed by an absorptive material inserted behind the substrate(s) for that purpose. The inventor has determined that, in general, two to four substrates are required to achieve the necessary degree of selection of wavelengths less than 290 nm in combination with the necessary degree of rejection of wavelengths greater than 290 nm.

Thus, the present invention uses a reflection-mode optical filter employing interference coatings to provide a combination of high passband transmission and high stopband rejection. Such a filter structure has unique benefits in the particular application of daylight corona detection, because of its ability to provide this combination of high in-band and very low out-of-band transmission for the particular bands that are optimum for the application. The reflective design embodiment of optical filter 101 provides substantial performance advantages in comparison with conventional transmissive-design optical filters, whether they use absorbers, thin-film interference layers, or a combination of the two, due to its ability to provide a combination of high in-band and very low out-of-band transmission for the particular bands that are optimum for the application, for the following reasons.

First, a combination of efficient selection of short wavelengths along with strong rejection of long wavelengths is much easier to achieve in a reflective than in a transmissive or absorptive filter design, this efficient selection property arising out of the fundamental optical properties of thin-film interference coatings. Second, a reflective design does not place any absorbing materials in the path of the selected light, and therefore can achieve lower losses of the passed radiation. Third, a reflective-design optical filter may be readily constructed entirely of "hard oxide" (also known as "refractory oxide") materials (such as hafnium oxide and silicon dioxide), deposited with energetic methods such as sputtering or ion plating, which produces a coating immune to environmental degradation or aging and which is much less subject to variation of optical properties with temperature. The terms "short-pass" and "hard oxide" are terms of art among thin-film coating engineers.

In general, it is preferable to orient the surface normals of pairs of the reflecting substrates parallel but not coplanar with each other, and simultaneously at an angle of 45 degrees from the optical axis defined by the incoming light rays from the object to be imaged, such that the optical axes of the incoming and outgoing ray bundles are parallel. If a 2-substrate design is used, the optical axes of the incoming and outgoing ray bundles will in general be parallel but displaced laterally, whereas a 4-substrate design will in general provide parallel and collinear input and output optical axes.

In alternative embodiments, an optical filter 101 of a type other than the types described above may also be employed, so long as the filter has the specified transmission and attenuation characteristics described above.

Light Image Detecting Device

Light image detecting device 103 may be any image detecting device having a useful degree of UV sensitivity over the range of sub-290 nm corona UV emission bands passed by optical filter 101. In an embodiment, light image detecting device 103 has a useful degree of UV sensitivity over the range between approximately 200 and approximately 280 nm. Thus, this range covers all of the potentially useful sub-290 nm corona emission bands, including the nine strongest corona emission bands centered at emission lines of approximately 204.5, 215.0, 226.0, 235.0, 236.0, 244.5, 246.5, 254.5 and 258.5 nm. In various embodiments or implementations, light image detecting device 103 may be an image intensifier tube, a CCD detector array, an intensified CCD or CID detector array, an electron-bombarded CCD detector array, or other suitable light-detecting device. Light detector 103 may be of the solar blind type, or of the non-solar blind type.

In a preferred embodiment, light image detecting device 103 provides amplification of the optical UV image received from lens 102; such devices include image intensifier tubes and electron-bombarded CCD array detectors. In general, the radiometric amplification factor of such a device will be at least 1,000 times and less than 10,000 times.

In a preferred embodiment, corona detector 100 of the present invention further employs a solar blind type of light image detecting and amplifying device 103, that is, one having not only a useful degree of UV sensitivity between approximately 200–205 and approximately 280–285 nm, but also a reduced sensitivity at wavelengths longer than 290 nm. Preferably, the radiation sensitivity of the photocathode of the light image detecting and amplifying device will decrease monotonically at all wavelengths longer than 290 nm. This characteristic in the sensitivity of detector 103 can help to reduce the degree of light rejection required of optical filter 101, as explained above. Devices having the largest negative slope of the wavelength sensitivity function at wavelengths longer than 290 nm are preferred. As noted above, such short-pass devices are commonly referred to as solar blind (although the term is a misnomer, but is nevertheless a common term of art), and derive their characteristic wavelength response function from a photocathode fabricated from cesium telluride (CsTe), rubidium telluride (RbTe), or cesium rubidium telluride (CsRbTe).

In an alternative embodiment, light detector 103 is of the non-solar blind type, i.e. it has good sensitivity at UV wavelengths from 200 nm to 280 nm, but does not have reduced sensitivity for wavelengths beyond 280 nm. Such a non-solar blind type of light detector may require a better optical filter 101 to ensure that light beyond 280 nm does not even reach light detector 103. A non-solar blind light detector may comprise an image-intensifier tube designed for good sensitivity (i.e. a photocathode responsivity of roughly 10 mA/W or greater) at the UV wavelengths from 200 nm to 280 nm. In one embodiment, a non-solar blind UV image intensifier comprises an input window composed of silica (quartz) or another UV-transmitting optical material, and comprises a photocathode of S-20, bialkalai, or similar UV-sensitive photocathode material. The photocathode diameter of the UV image intensifier may be 18 mm, 25 mm, or some other suitable size. The image intensifier power supply may be either internal or external. In one embodiment, the UV image intensifier utilized to implement light image detector 103 is a "Gen II" proximity-focused micro-channel plate intensifier having a photon gain of the order of 1,000–10,000. In an alternative embodiment, the UV image intensifier is a "Gen I" tube having lower gain and sensitivity but lower cost than Gen II type intensifiers. The UV image intensifier may also comprise output screen phosphors, such as P-20 or P-43 (green emission) phosphors.

In an embodiment, light image detector 103 detects and amplifies the filtered light, and also converts it from UV to visible wavelengths. Such a converting image detector 103 is preferably a UV image intensifier of the solar-blind type, but may also be a light detector of the non-solar blind type.

Display and/or Recording Device

Display/recording device 104 is a means for displaying and/or recording the output image produced by light image detecting device 103. Such devices include but are not limited to an eyepiece for direct viewing by eye of the output screen of an image intensifier tube, or a CCD detector array or camera combined with an electronic display.

In use, UV lens 102 of corona detector 100 is focused so that it forms an image of the electrical apparatus or other remote object to be inspected at the output of light image detector 103, e.g. an image on the photocathode of a UV image intensifier of the detector 103. An eyepiece, for example, of display/recording device 104 may receive the image output by light image detector 103, and is preferably focused to provide a focused image of the remote object and any corona, for example to a user's eye looking into the eyepiece. A dim image of the remote object may be visible in the eyepiece. If a corona discharge is present, a comparatively bright image of this discharge will be seen at the corresponding location on the object being inspected. Empirical testing of the invention confirms that corona discharges invisible to other methods can be detected with useful sensitivity at useful ranges.

Thus, in using corona detector 100, by rejecting all radiation above 290 nm and by passing radiation from 200–280 nm, terrestrial solar radiation is not present and corona emission lines from 200–280 nm will produce visible corona images to permit corona detection even in outdoor, bright daylight conditions, but without having to employ extremely narrow passband optical filters.

As will be appreciated, display/recording device 104 may be a display device containing, for example, and an image inverter and eyepiece to allow for human viewing. In alternative embodiments, however, other detection methods may be employed. For example, in one alternative embodiment, display/recording device 104 comprises an electronic detector which is positioned to receive the image of light image detector 103 (or incorporated therein), and suitably configured to be able to automatically detect any corona present in the image. In other embodiments, display/recording device 104 may comprise CCD arrays or other solid-state electronic image detectors such as CMOS imager technology, instead of an eyepiece and inverter, to capture the image provided by light image detector, e.g. the image provided on a phosphor screen of an image intensifier of light image detector 103. The image so captured may then be displayed on a monitor for viewing by human user or processed by an image processor configured to automatically detect coronas. In an embodiment, a CCD detector array is coupled to the output phosphor screen of an image intensifier, with the resulting image conveyed electronically to a video display screen, instead of directly viewing the intensifier output screen using an eyepiece.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. An apparatus for detecting a corona associated with a remote object under outdoor daylight conditions, comprising:
    (a) a selective optical filter for filtering light from the remote object, wherein the optical filter passes one or more of the corona emission bands centered at wavelengths below approximately 290 nanometers (nm) and rejects radiation at wavelengths above approximately 290 nm; and
    (b) a lens operatively coupled to the optical filter and for forming an image of the remote object, the lens having high transmissivity in the ultraviolet spectrum.

2. The apparatus of claim 1, wherein the optical filter passes all corona emission bands centered at wavelengths from approximately 205 nm to approximately 285 nm.

3. The apparatus of claim 1, wherein the optical filter passes one or more of the relatively intense sub-290 nm wavelength corona emission bands centered at wavelengths of approximately 204.5 nm, 215.0 nm, 226.0 nm, 235.0 nm, and 236.0 nm.

4. The apparatus of claim 3, wherein the optical filter passes all of the corona emission bands centered at wavelengths of approximately 204.5 nm, 215.0 nm, 226.0 nm, 235.0 nm, and 236.0 nm.

5. The apparatus of claim 1, wherein the optical filter rejects radiation at wavelengths exceeding 290 nm, whereby the apparatus has reduced sensitivity to radiation at wavelengths exceeding 290 nm.

6. The apparatus of claim 5, further comprising:
    (c) a light image detector for amplifying the image and converting the image from ultraviolet wavelengths to visible wavelengths to provide an amplified, converted image, the light image detector having comparatively high sensitivity in the ultraviolet portion of the spectrum at wavelengths below approximately 290 nm and having comparatively low sensitivity to radiation at wavelengths exceeding 290 nm,
    wherein the light image detector further reduces the sensitivity of the apparatus to radiation at wavelengths exceeding 290 nm.

7. The apparatus of claim 6, wherein the following relationship is approximately satisfied for wavelengths ($\lambda$) exceeding 290 nm:

$$2 \cdot 10^{-13} \leq T(\lambda)Q(\lambda) \leq 2 \cdot 10^{-9}$$

where $T(\lambda)$ is the fraction of incoming radiation passed by the optical filter as a function of wavelength and $Q(\lambda)$ is the fractional quantum efficiency of the light image detector as a function of wavelength.

8. The apparatus of claim 6, wherein the light image detector comprises a photocathode of the solar blind type, comprising one of cesium telluride, rubidium telluride, and cesium rubidium telluride.

9. The apparatus of claim 8, wherein the following relationship is approximately satisfied for wavelengths ($\lambda$) exceeding 350 nm:

$$2 \cdot 10^{-13} \leq T(\lambda)Q(\lambda) \leq 2 \cdot 10^{-9}$$

where $T(\lambda)$ is the fraction of incoming radiation passed by the optical filter as a function of wavelength and $Q(\lambda)$ is the fractional quantum efficiency of the light image detector as a function of wavelength, wherein the value of $T(\lambda)$ over the range of wavelengths from 290 nm to 350 nm is approximately equal the value of $T(\lambda)$ as given by the relationship for a wavelength $\lambda$ of 350 nm.

10. The apparatus of claim 6, wherein the light image detector comprises an image intensifier tube.

11. The apparatus of claim 10, further comprising:

(d) a display device for viewing the amplified, converted image provided by the image intensifier tube.

12. The apparatus of claim 11, wherein the display device comprises:

an image inverter for inverting the amplified, converted image provided by the image intensifier tube to provide an inverted image; and an eyepiece for viewing the inverted image provided by the image inverter.

13. The apparatus of claim 1, wherein selective optical filter is a reflective design interference-type optical filter comprising one or more substrates, wherein radiation to be passed is sequentially reflected from each of the one or more substrates and radiation to be rejected is transmitted through the substrates and absorbed an absorptive material.

14. The apparatus of claim 13, wherein the one or more substrates comprises one of two reflective substrates, three reflective substrates, and four reflective substrates.

15. The apparatus of claim 1, wherein the optical filter is a shortpass optical filter.

16. The apparatus of claim 1, wherein the optical filter is positioned in front of the lens so that the lens receives light filtered by the optical filter.

17. The apparatus of claim 1, wherein the optical filter passes one or more of the relatively intense sub-290 nm wavelength corona emission bands centered at wavelengths of approximately 204.5 nm, 215.0 nm, 226.0 nm, 235.0 nm, 236.0 nm, 244.5 nm, 246.5 nm, 254.5 nm, and 258.5 nm.

18. The apparatus of claim 17, wherein the optical filter passes all of the corona emission bands centered at wavelengths of approximately 204.5 nm, 215.0 nm, 226.0 nm, 235.0 nm, 236.0 nm, 244.5 nm, 246.5 nm, 254.5 nm, and 258.5 nm.

* * * * *